Patented Mar. 14, 1939

2,150,235

UNITED STATES PATENT OFFICE 2,150,235

TREATMENT OF TITANIUM PIGMENTS

Robert M. McKinney, Roselle, Del., assignor to E. I. du Pont de Nemours & Company, Wilmington, Del., a corporation of Delaware Application June 5, 1937, Serial No. 146,541

8 Claims. (Cl. 134—58)

The present invention relates to a process for the production of improved titanium pigments. More particularly it relates to a process for controlling the oil-absorption property of titanium pigments. Still more particularly it relates to a process for producing a titanium pigment substantially free from coarse particles. Still more particularly it relates to an improved titanium dioxide pigment.

The major part of the world production of titanium dioxide is made from ilmenite ore (iron titanate) by processes which generally consist in dissolving the ore in sulfuric acid, hydrolyzing the resulting solution containing titanic and ferrous sulfates to precipitate the titanium as titanic acid, filtering and washing the titanic acid precipitate to remove the ferrous sulfate and free sulfuric acid, treating the washed precipitate with an alkali salt, and calcining the raw salt-treated titanic acid. The calcination step is important not only for the purpose of removing the combined or absorbed water and acid to form a reasonably pure titanium dioxide, but also to develop the major pigment properties of high tinting strength, high hiding power, and suitable oil absorption characteristics. The development of pigment properties during calcination is greatly aided by the presence of added alkali salt.

I have found that titanium dioxide prepared as outlined above usually contains particles which are considerably larger than any of those present immediately after wet grinding. Such particles may range from 10 to 100 microns or larger and consist of aggregates of the finer (3–5 micron) particles so firmly cemented together that they persist in spite of the dry grinding operations to which the pigment is subjected. The presence of these coarse aggregates is deleterious and disadvantageous. For instance an enamel paint prepared from such pigment must be subjected to prolonged and expensive grinding, or else the film resulting from its application will contain coarse particles which mar the smoothness, gloss, and general appearance.

A convenient and practical test for the semi-quantitative determination of coarse particles consists in grinding a properly proportioned mixture of the pigment with a suitable vehicle through a roller mill, the rolls of which are set a small but definite distance apart, or with a definite pressure along the lines of contact. A film prepared from the resulting enamel paint by a "draw-down" on a glass plate or by a "spin-out" is compared for film fineness and for the presence of coarse, gritty aggregates against a set of arbitrary standards. The standards which I have used range from "1" at the bottom of the scale, representing a film with extremely coarse particles and sand-like in appearance, to "18" at the top of the scale, representing a film with practically no perceptible coarse particles, smooth and glass-like in appearance. The intermediate standards represent gradual and evenly spaced gradations from one extreme to the other. This test will be referred to as the "paint grit" test.

Oil absorption is generally recognized as an important pigment property and one which should be controlled within definite limits, depending on the intended use of the pigment. Thus, in the case of titanium dioxide, it has been found that too high an oil absorption results in difficulty to the consumer in that his paints are too thick and their gloss is impaired, while too low an oil absorption results in thin paints which tend to sag or run subsequent to application. These difficulties resulting from variable oil absorption can be corrected in general by reformulation of the paint. However, this procedure is inconvenient to the consumer and he prefers pigments having the same oil absorption characteristics from time to time.

The term "oil absorption" as used herein indicates the weight of linseed oil in grams per 100 grams of pigment necessary to produce incipient plasticity when mixed with the pigment under standardized conditions of time and manner of mixing together with the necessary corrective measures to eliminate the effects of temperature and humidity while running the test. The method is described in detail by Booge in "Paint, Oil and Chemical Review", of May 7, 1924.

In the manufacture of titanium dioxide, the nature and amount of salt used in treating the raw pigment just prior to calcination and the calcination conditions themselves are important factors affecting oil absorption. In general, sodium sulfate or carbonate used in the salt treatment produces a pigment of lower oil absorption than potassium sulfate or carbonate. As the amount of these salts is increased, the oil absorption is reduced. However, the use of increased quantities of alkali metal salts is often harmful to other pigment properties such as color, strength, fineness, etc.

Ilmenite ore varies considerably in respect to the nature and amount of impurities present depending on the source and ore dressing methods employed to prepare a concentrated ilmenite from the crude ore. In many cases, these impurities consist, in part at least, of phosphate bearing minerals which, in general, are more or less soluble in the strong sulfuric acid used for dissolving the ilmenite.

The phosphoric acid which is formed during the dissolving operation is not removed from the titanium solution prior to hydrolysis. During hydrolysis, this phosphoric acid is mostly adsorbed by the titanic acid precipitate, the amount depending on the concentrations of phosphoric and sulfuric acids present in the solution undergoing hydrolysis. Only a small portion, if any, of this adsorbed phosphate is removed with the ferrous sulfate during the subsequent steps of filtration and washing. The major portion is present in the raw pigment immediately prior to calcination and may vary considerably, depending primarily on the phosphate content of the ore and to a lesser degree on various processing variables.

The present invention has as an object the improvement in the grit and fineness properties of finished titanium pigments. A further object is the control of the oil absorption property of titanium pigments. A still further object is the substantial elimination of hydrated titanic acid from the finished titanium pigment. A still further object is to obtain a calcined titanium pigment having a pH value of from 6.5 to 8.0. Still further objects will become apparent from an examination of the herein described invention.

Broadly the present invention comprises controlling the molar ratio of the alkali metal and the phosphate present in the titanium pigment during calcination.

In a more restricted sense the present invention comprises having the alkali metal and phosphate content of the titanium pigment as calcined within the molar ratio range of about one mole of an alkali metal and about one mole of phosphate to about one and six tenths moles of an alkali metal and about one mole of phosphate. By the term "molar ratio" I mean the ratio of atomic weights of alkali metal to atomic weights of phosphorus, e. g. where the alkali metal is potassium a molar ratio of 1:1 would require 39.1 potassium to 31.02 phosphorus. Thus, by having the alkali metal and phosphate content of the titanium pigment as calcined within the molar ratio range of about 1:1 to 1.6:1, a greatly improved titanium pigment is obtained. Also, the oil absorption properties of the titanium pigments are controlled by keeping the molar ratio of the alkali metal and phosphate in the titanium pigment as calcined within the above range. A titanium pigment having either high or low oil absorption properties may be obtained by controlling the amount of alkali metal which is added to the titanium pigment within a predetermined range and by having sufficient phosphate present in the pigment so that the alkali metal-phosphate ratio is 1:1 to 1.6:1. For example, if a high oil absorption titanium pigment is desired, between about 0.2% to about 0.4% of an alkali salt (calculated as sulphate) is added to the titanium pigment prior to calcination and sufficient phosphate is present in the titanium pigment prior to calcination to give an alkali metal-phosphate ratio of 1:1 to 1.6:1. If a low oil absorption pigment is desired, between about 0.7% to 3.0% of an alkali salt (calculated as sulphate) is added to the titanium pigment prior to calcination and sufficient phosphate is present to give an alkali metal-phosphate ratio of 1:1 to 1.6:1. If a titanium pigment which has neither high nor low oil absorption properties is desired, between about 0.4% to about 0.7% of an alkali salt (calculated as sulphate) is added to the titanium pigment prior to calcination and sufficient phosphate is present so that the alkali metal-phosphate ratio is 1:1 to 1.6:1. However, regardless of the amount of alkali salt which is added, the alkali metal-phosphate ratio should be within the range of 1:1 to 1.6:1.

The preferred embodiment of the present invention is as follows:

Titanic acid is precipitated by hydrolysis, filtered, washed and repulped in water. Representative samples of the slurry are analyzed to determine their $P_2O_5$ content.

For producing a low oil absorption pigment, the alkali salt content of the pigment prior to calcination is between about 0.7% to about 3.0% and sufficient phosphate is present so that the M/P ratio is within the above range. For such treatment, alkali phosphates may be employed as well as other alkali salts and phosphate salts or phosphoric acid. To produce a high oil absorption pigment both the alkali salt and phosphate content of the pigment is kept low so that there is present in the pigment about 0.2% to about 0.4% of an alkali salt and an M/P ratio of 1.3:1 to 1.4:1. A practical limit to increasing oil absorption by this means is imposed by the extent to which the ore can be freed from phosphate bearing minerals.

In determining the amount of alkali metal salt or alkali metal salt and phosphate which is added in order to obtain the desired molar ratio, the losses of the alkali metal salt during the filtration step immediately following salt treatment and immediately prior to calcination and the slight losses of $P_2O_5$ during calcination are allowed for.

The alkali metal salts which are preferred in carrying out this invention are the potassium salts, preferably potassium sulfate.

I have found that the pH value of a slurry obtained by mixing titanium dioxide which has been calcined to optimum quality with pure distilled water is an excellent indication of whether the molar ratio of potassium and phosphorus was correctly adjusted to within the specified limits prior to calcination. Thus, as the molar ratio is increased from 1 to 1.6, the pH increases from about 6.5 to 8.0. For optimum paint grit, the pH of a slurry of the calcined pigment will range from 7.2 to 7.4.

A further advantage of pigments prepared according to my invention, particularly those manufactured in the molar ratio range of 1 to 1.3, lies in the substantial elimination of hydrated titanic acid formed subsequent to calcination by decomposition of titanium salts (titanates and phosphates). Hydrated titanic acid has been shown to have a marked detrimental effect on the color of baked glyptal films. Further, in certain vehicles, the presence of hydrated titanic acid is disadvantageous in that it is acted upon by the vehicle and converted into blue or gray titanous compounds, causing discoloration of the system.

While the molar ratio between the alkali metal salt and the phosphate may vary, I prefer having the molar ratio within the limits of between about 1:1 to 1.6:1 and preferably between 1.3:1 to 1.4:1.

Any alkali salt can be used in carrying out the herein described invention provided the acid radical is volatile under the conditions of calcination. Among these are sodium acid sulfate, sodium sulfate, sodium sulfite, sodium carbonate, potassium sulfate, potassium carbonate, potassium chloride, potassium hydroxide, etc. The other metals of the alkali group, such as rubidium, and caesium are satisfactory but because of their scarcity and resulting high price are not commercially practical.

The term "titanium pigments" as used in the herein disclosure and appended claims means pure titanium dioxide pigments as well as titanium dioxide calcined in the presence of extenders such as sulfates of barium and calcium, etc.

If it is desired to add phosphate to the titanium pigment in order to obtain the desired M/P ratio as discussed above, phosphorus compounds such as alkali salts and acids of ortho-phosphoric, pyro-phosphoric and meta-phosphoric acids and other compounds of phosphorus which will yield phosphate when heated with an alkali hydroxide may be used.

Figure 1 shows that the paint grit improves as the molar ratio (K/P) is increased, reaching a maximum at about 1.35, and falls off rapidly as the molar ratio is further increased. A study of the data tabulated in the following table shows that this relation depends only on the K/P ratio and is independent, within the range covered, of the absolute quantities of either potassium or phosphorus.

Table I

Figure 1:
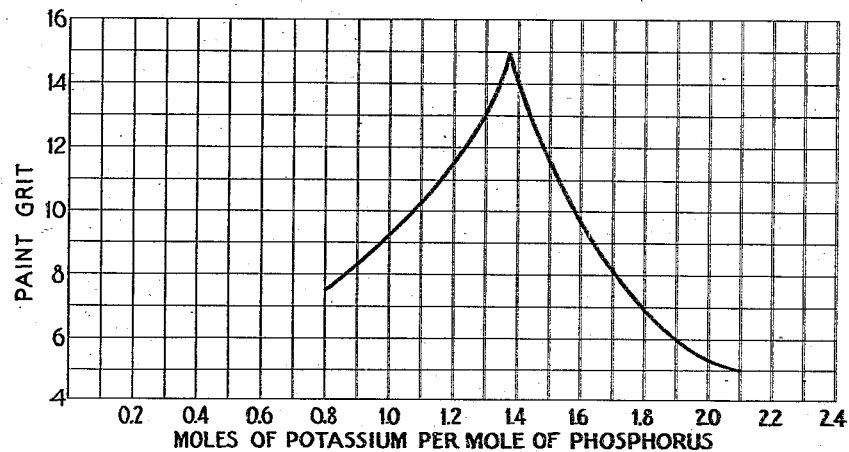
Figure 1 is a curve showing the relation between "paint grit" and the molar ratio of potassium and phosphorus.

Quantities of potassium and phosphorus in $TiO_2$ during calcination

| Pigment | Percent $K_2SO_4$ | Percent $P_2O_5$ | Molar ratio K/P | Paint grit rating |
|---|---|---|---|---|
| A | 0.76 | 0.70 | 0.88 | 9 |
| B | 0.92 | 0.67 | 1.12 | 10 |
| C | 0.89 | 0.65 | 1.12 | 11 |
| D | 1.14 | 0.638 | 1.46 | 12 |
| E | 0.91 | 0.611 | 1.21 | 10+ |
| F | 0.73 | 0.360 | 1.65 | 10 |
| G | 0.82 | 0.360 | 1.85 | 7 |
| H | 0.79 | 0.357 | 1.80 | 6+ |
| I | 0.94 | 0.363 | 2.11 | 6 |
| J | 0.65 | 0.320 | 1.65 | 7 |
| K | 0.53 | 0.370 | 1.17 | 12+ |

The paint-grit rating in Table I was determined in the following manner:

A standard weight of finished dry pigment is mixed in the ratio of 65/35 with a four-hour white enamel grinding varnish. This paste is then passed once thru a paint roller mill set accurately in such a way that the rolls are exactly .0015 inch apart. After grinding the paste is reduced to a pigment vehicle ratio of 50/50 with more of the original varnish. The resultant enamel is drawn down on a plain glass plate to form a film of uniform thickness equal to that of the mill clearance given above. This uniform film thickness is obtained by placing two metal strips of .0015 inch thickness about three inches apart on the glass plate, and drawing down about two cubic centimeters of the enamel with a machine-planed straight edge. After drying, the film is compared against arbitrary permanent standards prepared in the same manner. The standard draw downs range from "zero", representing an extremely poor pigment containing an exceedingly large amount of the gritty cemented particles, to "18" which represents a pigment entirely free of grit and cemented or aggregated particles the film being smooth, unbroken, and high in gloss.

Thus pigments E and I were treated with approximately the same amounts of potassium sulphate. Due to the low phosphorus content of pigment I, the K/P molar ratio was extremely high and consequently the paint grit was poor. On the other hand, pigments C and K received widely different salt treatments, but due to the difference in phosphate contents, the molar ratios, and consequently, the paint grits were about the same.

I prepared pigment K in continuous plant scale equipment as follows. The various data which I have recorded are averages covering the entire period of the run. Titanic acid was precipitated by hydrolysis, filtered, washed, and repulped in sufficient water to give a slurry containing an average of 390 g/l of $TiO_2$. Representative samples of this slurry were analyzed for the purpose of determining their $P_2O_5$ content. Allowing for losses of potassium sulphate during the filtration step immediately following salt treatment and immediately prior to calcination, and allowing for slight losses of $P_2O_5$ during calcination, the necessary amount of potassium sulphate to produce a molar ratio of 1.17 in the pigment as calcined was then calculated for each of a series of treatments. The potassium sulphate was added as a solution containing 87 g/l of $K_2SO_4$.

The slurry was then filtered in such a manner as to produce a cake containing an average of 40% $TiO_2$ and 0.53% $K_2SO_4$ based on the $TiO_2$. Examination of the filtrate showed that it contained only a negligible trace of phosphate indicating that the phosphate was adsorbed or combined quantitatively with the titanic acid. The potassium sulphate content of the filtrate was such as to account for the difference between that actually added and that found in the filtered cake. The filtered cake containing 0.53% $K_2SO_4$ was then calcined to optimum pigment properties in equipment well known in the art. Samples of the calciner-discharge were analyzed and found to contain 0.3% $P_2O_5$ on the average, which corresponded to a molar ratio of 1.17 on the basis of the 0.53% $K_2SO_4$ content prior to calcination. When mixed with pure distilled water, the resulting slurry was found to have a pH of 7.3. The pigment after cooling was ground in accordance with the process described in U. S. Patent 1,937,036. Microscopic examination of the resulting ground slurry prior to flocculation showed that it contained no particles as large as 10 microns in diameter, the average particle size being well below 5 microns in diameter. The slurry was then flocculated and filtered to a cake containing about 60% $TiO_2$ after which it was dried. The filter cake was dried at a temperature of not less than 150° C. and not more than 170° C. in a continuous steam heated rotary drier. The drier discharge was then disintegrated in a mill of the hammer type to produce finished titanium dioxide a representative sample of which was tested for paint grit. With the exception of the variables noted in the preceding Table I, the other pigments enumerated therein were prepared in the same manner.

Figure 2:
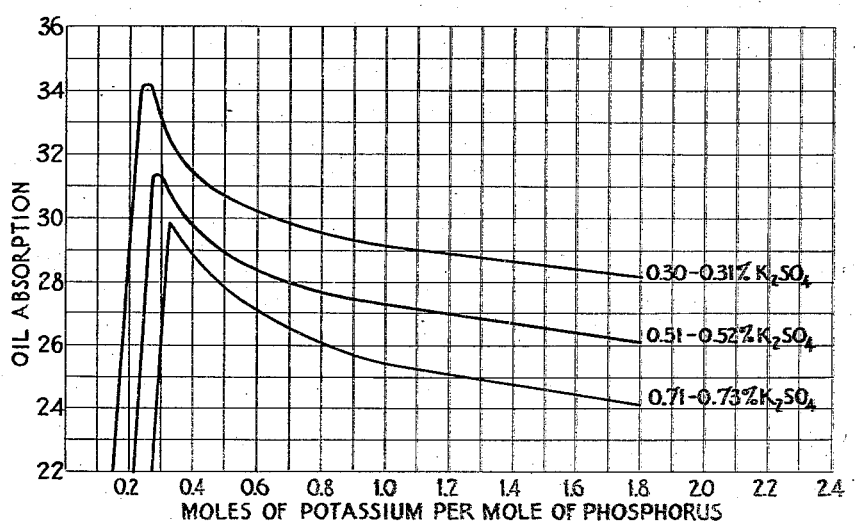
Figure 2 is a family of curves showing the relation between oil absorption and the molar ratio of potassium and phosphorus for various amounts of potassium.

Referring to Figure 2 and to the following tabulation of data, showing the relations existing between the oil absorption of finished titanium dioxide and the potassium sulphate and phosphate contents of the raw pigment just prior to calcination, the following facts become evident.

(1) At a constant potassium sulphate content, oil absorption is affected to a marked degree by the phosphate content over a wide range of phosphate variations. At low molar ratios (high phosphate), the oil absorption is low. As the molar ratio is increased by lowering the phosphate content, the oil absorption increases rapidly to a maximum and falls off rapidly at first and finally more gradually as the molar ratio is further increased.

(2) In the molar ratio range which is of interest in connection with paint grit (1.0-1.6) oil absorption does not vary greatly as the phosphate content is varied. However, it is affected considerably by the potassium content.

(3) The data clearly indicate considerable latitude in oil absorption control in the molar ratio range which is of interest in connection with optimum paint grit by varying both potassium and phosphate in such a manner as to maintain the molar ratio within the specified limits.

(4) With extremely low molar ratios resulting from high phosphate contents, color and strength tend to be poor, being very disadvantageous in the use of certain types of ore in prior procedures.

The following table demonstrates the effects which different amounts of potassium sulfate and phosphate when present during calcination have upon color, tinting strength, and oil absorption:—

TABLE II

| Pigment No. | Percent $K_2SO_4$ based on $TiO_2$ as calcined | $P_2O_5$ based on $TiO_2$ as calcined | | | Molar ratio K/P | Properties | | |
|---|---|---|---|---|---|---|---|---|
| | | From ore | Added as $H_3PO_4$ | Total | | Color | T. S. | O. A. |
| 1 | 0.72 | 0.32 | 0 | 0.32 | 1.83 | 15 | 150 | 23.9 |
| 2 | 0.51 | 0.32 | 0 | 0.32 | 1.30 | 19 | 147 | 27.0 |
| 3 | 0.51 | 0.32 | 0.09 | 0.41 | 1.02 | 17 | 150 | 27.2 |
| 4 | 0.51 | 0.32 | 0.28 | 0.60 | 0.69 | 18 | 144 | 27.2 |
| 5 | 0.51 | 0.32 | 0.56 | 0.88 | 0.47 | 18 | 147 | 28.6 |
| 6 | 0.30 | 0.32 | 0 | 0.32 | 0.76 | 18 | 146 | 29.2 |
| 7 | 0 | 0.63 | 0 | 0.63 | | 13 | 130 | 24.7 |
| 8 | 0.31 | 0.63 | 0 | 0.63 | 0.40 | 17 | 139 | 31.3 |
| 9 | 0.31 | 0.63 | 0.49 | 1.12 | 0.23 | 18 | 143 | 27.9 |
| 10 | 0.81 | 0.63 | 0.98 | 1.61 | 0.16 | 11 | 130 | 23.4 |
| 11 | 0.52 | 0.63 | 0 | 0.63 | 0.67 | 17 | 143 | 27.9 |
| 12 | 0.52 | 0.63 | 0.49 | 1.12 | 0.38 | 18 | 144 | 32.6 |
| 13 | 0.52 | 0.63 | 0.98 | 1.61 | 0.26 | 17 | 140 | 31.0 |
| 14 | 0.73 | 0.63 | 0 | 0.63 | 0.95 | 18 | 152 | 25.3 |
| 15 | 0.73 | 0.63 | 0.49 | 1.12 | 0.53 | 17 | 155 | 27.6 |
| 16 | 0.73 | 0.63 | 0.98 | 1.61 | 0.37 | 15 | 148 | 29.8 |
| 17 | 0.31 | 0.32 | 0 | 0.32 | 0.79 | 20 | 139 | 31.2 |
| 18 | 0.51 | 0.32 | 0 | 0.32 | 1.30 | 21 | 143 | 27.1 |
| 19 | 0.71 | 0.32 | 0 | 0.32 | 1.81 | 20 | 145 | 24.5 |
| 20 | 0.30 | 0.32 | 2.41 | 1.72 | 0.142 | -12 | 136 | 22.0 |

The color and tinting strength scale is arbitrarily chosen and the higher the figure the better the quality.

Referring to the above Table II, I prepared pigment #18 in the following manner. Raw titanic acid was precipitated by hydrolysis, filtered, washed, and repulped in sufficient water to give a $TiO_2$ concentration of 380 g./l. A sample of this slurry was analyzed and found to contain 0.32% $P_2O_5$ based on the $TiO_2$. A solution of potassium sulfate was added to this slurry in sufficient quantity to introduce 0.66% $K_2SO_4$ based on the $TiO_2$. The slurry was filtered in such a manner that 0.51% $K_2SO_4$ based on the $TiO_2$ remained in the filter cake and this was calcined and ground on experimental scale under conditions similar to those previously mentioned. The dried sample was ground through bolting cloth and tested for oil absorption and the other recorded properties. With the exception of the variables noted in the preceding Table II, the other pigments enumerated therein were prepared in the same manner. In cases where the phosphate content was increased over and above that already in the pigment resulting from solution of phosphate bearing minerals in the ore, this was accomplished by adding phosphoric acid during the salt treatment in the quantities indicated.

From the foregoing it will be evident that my invention affords a method whereby one may predetermine the proper alkali salt treatment to be used in order that the highest quality may be obtained. As previously disclosed, the phosphate content will vary considerably due to variation in the raw materials used in the process and no commercial method of removal of the phosphate from the solution prior to the hydrolysis nor from the precipitated titanium oxide is available. In the preferred practise of my process, I first analyze the washed hydrolysis product for phosphates and the amount of the alkali salt to be used is selected from the value obtained. This method of predetermining the proper treatment has been found to be extremely useful in the industry.

In some instances I may prefer to increase the phosphate content over that naturally present and in such instances I find it useful to also analyze the washed hydrolysis product for phosphate. For unknown reasons, different raw pigments having the same amount of alkali salt and phosphate content at the time of calcination give products of varying oil absorption. It is therefore expedient to first determine the amount of reagents with the preferred molar ratio that will give the desired oil absorption by experimental trial. From this experimental data, the proper treatment is selected. This method of predetermining the proper alkali salt treatment with the preferred molar ratio is very useful when a product in the lower oil absorption range is desired.

This reduction of coarse aggregates in accordance with the herein described invention is a distinct advantage to the consumer of titanium dioxide as evidenced by the increased demand for this type of pigment as compared with the prior art type containing more coarse gritty aggregates. This, coupled with a wide range of possible oil absorption values to meet the consumer's requirements, constitutes a marked advantage of pigments prepared by means of my invention over prior art pigments.

Having disclosed the herein described invention the following is claimed as new and useful:

1. An improved pigment which comprises a calcined mixture of a titanium pigment, an alkali metal phosphate, and a water soluble inorganic alkali metal salt, the "molar ratio" of the alkali metal to phosphorus in the mixture being within the range of about 1:1 to about 1.6:1.

2. An improved pigment which comprises a calcined mixture of a titanium pigment, an alkali metal phosphate, and a water soluble inorganic alkali metal salt, the "molar ratio" of alkali metal to phosphorus in said mixture being within the range of about 1:1 to about 1.6:1 and the alkali metal salt content being between about 0.2% and about 3.0%, calculated as the alkali metal sulphate, and based upon the weight of the titanium pigment.

3. An improved pigment which comprises a calcined mixture of a titanium pigment, a potassium phosphate, and a water soluble inorganic potassium salt, the "molar ratio" of potassium to phosphorus in said mixture being within the range of about 1.3:1 to about 1.4:1 and the potassium content being between about 0.2% and about 3%, calculated as potassium sulphate and based upon the weight of the titanium pigment.

4. In a process for producing an improved calcined pigment from a phosphoric acid containing pigment the steps which comprise adding to said titanium pigment a sufficient amount of a water soluble alkali metal salt so that the "molar ratio" of the alkali metal to phosphorus in said mixture is within the range of about 1:1 to about 1.6:1, and thereafter calcining.

5. In a process for producing an improved pigment from a phosphoric acid containing hydrolytically precipitated titanium pigment composition the steps which comprise increasing the phosphate content by the addition of a member selected from the class consisting of alkali metal phosphates and phosphorus acids, adding a sufficient amount of a water soluble inorganic alkali metal salt to give an alkali metal to phosphorus "molar ratio" in said mixture within the range of about 1:1 to about 1.6:1 and subsequently calcining said mixture.

6. In a process for producing an improved pigment the steps which comprise adding to a titanium pigment between about 0.2% to about 3%, calculated as the alkali metal sulfate and based upon the weight of the titanium pigment, of a water soluble alkali metal salt and adding a sufficient amount of a phosphorus compound selected from the class consisting of alkali metal phosphates and phosphorus acids so that the "molar ratio" of the alkali metal to phosphorus in said mixture is within the range of about 1:1 to about 1.6:1, and subsequently calcining said mixture.

7. In a process for producing an improved pigment the steps which comprise calcining a titanium oxide pigment containing an absorbed phosphoric acid in the presence of about 0.2% to about 3%, calculated as the alkali metal sulfate and based upon the weight of the titanium pigment, of a water soluble inorganic alkali metal salt, the "molar ratio" of the alkali metal to phosphorus in the mixture being within the range of about 1:1 to about 1.6:1.

8. In a process for producing an improved pigment the steps which comprise calcining a titanium oxide pigment containing an absorbed phosphoric acid in the presence of about 0.2% to about 3%, calculated as potassium sulfate and based upon the weight of the titanium pigment, of a water soluble inorganic potassium salt, the "molar ratio" of potassium to phosphorus in the mixture being within the range of about 1.3:1 to about 1.4:1.

ROBERT M. McKINNEY.